UNITED STATES PATENT OFFICE.

ALBRECHT SCHMIDT, OF BERLIN, GERMANY.

PRODUCTION OF PROTOCATECHUIC ALDEHYDE-META-ALKYL ETHERS.

SPECIFICATION forming part of Letters Patent No. 543,193, dated July 23, 1895.

Application filed July 21, 1894. Serial No. 518,242. (Specimens.)

*To all whom it may concern:*

Be it known that I, ALBRECHT SCHMIDT, a subject of the King of Prussia, German Emperor, residing at Berlin, Prussia, Germany, have invented certain new and useful Improvements in and Relating to the Production of Protocatechuic Aldehyde-Meta-Alkyl Ethers for Use in Perfumery and other Uses; and I do hereby declare the following to be a full, clear, and exact description of the invention, such as will enable others skilled in the art to which it appertains to make and use the same.

The method relates to the production of protocatechuic aldehyde-meta-alkyl ethers.

The main principle of my invention consists in substituting for the hydrogen of the hydroxyl group, being in para position to the COH group of protocatechuic aldehyde, a group that may be easily removed again—for instance, the benzenesulfo, the toluenesulfo group, and the like—i. e., at first in obtaining compounds of the type of para-benzenesulfoprotocatechuic aldehyde.

The method consists in the combination of the following three processes:

I. Converting the mono-metallic salts of protocatechuic aldehyde into compounds of the type of para-benzenesulfoprotocatechuic aldehyde;

II. Subsequently alkylating a metallic salt of these compounds the type of para-benzenesulfoprotocatechuic aldehyde, and III. Separating the protocatechuic aldehyde-meta-alkyl ethers from the aromatic protocatechuic aldehyde-meta-alkyl ethers so formed.

The formation of the protocatechuic aldehyde-meta-alkyl ethers may be expressed by the following equations:

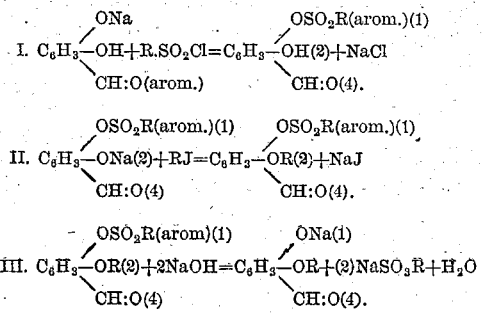

The first operation—the preparation of aromatic para-sulfo derivatives of protocatechuic aldehyde—is effected in the following manner: One molecular proportion of an aromatic sulfo-haloid (for instance, benzenesulfo-chlorid, para, meta, or ortho toluenesulfo-chlorid, alpha or beta naphthalenesulfo-chlorid, &c.) is brought together with one molecular proportion of protocatechuic aldehyde and one molecular proportion of an alkaline hydroxid or earth alkaline hydroxid, or it may be an equivalent quantity of an alkaline or earth alkaline carbonate or phosphate, either in alcoholic or aqueous solution, warm or at ordinary temperature; or the solid mono-metallic salt of protocatechuic aldehyde is brought together with the sulfo-haloid in the presence of an indifferent diluent, as common salt, toluene, chloroform, &c. Besides the para-sulfo compound of protocatechuic aldehyde, small quantities of a di-sulfo derivative and, according to the conditions, smaller or larger quantities of a meta-sulfo derivative are formed—especially in the latter way there is obtained nearly exclusively the meta-sulfo compound—which can easily be separated from the para-sulfo compound by crystallization or by conversion into a salt, the best into the barium salt.

In the second operation the alkylation can best be effected in the following manner: The alkali salts of the compounds of the type of para-benzenesulfo protocatechuic aldehyde are treated in alcoholic solution with an alkyl haloid. In place of the alkyl haloid the equivalent quantity of a salt of alkyl sulfuric acid can also be employed.

In the third operation the meta-alkyl ethers of protocatechuic aldehyde are separated from the aromatic sulfo derivatives by means of known saponification methods.

In carrying out my invention I proceed as follows:

I. *Production of Compounds of the Type of Para-benzenesulfoprotocatechuic Aldehyde.*

A. *Preparation of para-benzenesulfoprotocatechuic aldehyde.*—For example, (a,) to an ice-cold solution of four hundred grams protocatechuic aldehyde in ten liters water a solution of five hundred and ten grams benzenesulfo-chlorid in five liters ether are added. A solution of seven hundred and thirty cubic centimeters caustic-soda solution, containing fifteen per cent. sodium hydroxid and diluted with five liters of water, is then slowly run in with constant and energetic stirring. After the odor of the sulfo-chlorid has disappeared a like quantity of caustic-soda solution is added, whereby the para-benzenesulfoprotocatechuic aldehyde that has been formed is brought into the alkaline solution. The ethereal layer contains small quantities of the disulfo product, from which protocatechuic aldehyde can easily be regenerated. The alkaline liquors are acidified with hydrochloric acid, whereby the para-benzenesulfoprotocatechuic aldehyde is separated as an oil that gradually becomes crystalline. Under these conditions only very small quantities of meta-benzenesulfoprotocatechuic aldehyde are formed, and these can be separated by crystallizing the crude product out of toluene; or a still more advantageous procedure is to add an excess of saturated baryta water to the alcoholic solution of the crude product, remove the precipitated barium salt of para-benzenesulfoprotocatechuic aldehyde and decompose it with acid. The barium salt of meta-benzenesulfoprotocatechuic aldehyde is much more easily soluble and separates out of the aqueous solution much more slowly. The para-benzenesulfoprotocatechuic aldehyde crystallizes from toluene in radiating groups of acicular crystals, which melt at about 110° centigrade. The isomeric meta product melts at about 147° centigrade.

Example b: To a solution of sixty grams protocatechuic aldehyde in three hundred grams alcohol and one hundred and twenty cubic centimeters alcoholic potash, containing twenty per cent., by volume, of potassium hydroxid, seventy-eight grams benzenesulfo-chlorid are gradually added, care being taken to keep the mixture cool. The residue remaining after evaporation of the alcohol is taken up with dilute caustic-soda solution, and the solution then shaken with ether in order to remove a small quantity of dibenzenesulfoprotocatechuic aldehyde. The mono-benzenesulfoprotocatechuic aldehyde is then precipitated from the alkaline solution with acids as an oil that gradually crystallizes and is further worked up, as in Example a. Under these conditions more of the isomeric meta product is obtained than in Example a.

B. *Preparation of para-toluenesulfoprotocatechuic aldehyde.*—This is prepared in the way above described. It crystallizes from toluene in warty crystals that melt at about 118° centigrade. In the same way the derivatives of ortho and meta toluenesulfonic acids, as well as of alpha and beta naphthalenesulfonic acids, are obtained. All these compounds of the type of para-benzenesulfoprotocatechuic aldehyde represent new products.

II. *Production of Aromatic Ethers of the Type of Para-benzenesulfoprotocatechuic Aldehyde-meta-alkyl Ether.*

1. *Para - benzenesulfoprotocatechuic aldehyde-meta-methyl ether.*—For example, to a solution of forty grams benzenesulfoprotocatechuic aldehyde and thirty grams methyl iodid in eighty grams methyl alcohol forty cubic centimeters alcoholic potash solution, containing twenty per cent. caustic potash, by volume, or preferably the equivalent quantity of sodium methylate, is added. The mixture is either allowed to stand for a long time at a moderate temperature or heated a short time under pressure in the water bath. After evaporation of the alcohol the residual oil is taken up with ether and the ethereal solution shaken with caustic-soda solution to remove traces of unaltered benzenesulfoprotocatechuic aldehyde. On distilling off the ether from the ethereal layer the benzenesulfoprotocatechuic aldehyde-meta-methyl ether remains behind as a thick oil, which quickly solidifies, and may be obtained in crystals melting at 69° to 70° centigrade. The methyl ether of the benzenesulfoprotocatechuic aldehyde is not soluble in alkaline carbonates and cold sodium-lye; but by heating with soda-lye the ether is decomposed into the sodium salt of benzenesulfonic acid and in the sodium salt of protocatechuic aldehyde-meta-methyl ether. The methylation of para-toluelenesulfoprotocatechuic aldehyde is carried out in the same way with methyl iodid or with a salt of methyl sulfuric acid. The para-toluelene-sulfoprotocatechuic aldehyde-meta-methyl ether crystallizes from alcohol in thick needles, which melt at about 115° centigrade.

2. *Para-benzenesulfoprotocatechuic aldehyde-meta ethyl ether.*—Example: To a solution of forty grams of para-benzenesulfoprotocatechuic aldehyde and twenty-three grams of spirit are added forty cubic centimeters of an alcoholic solution of potash of twenty per cent. (KOH), by volume, or, better, the equivalent quantity of sodium ethylate, and either left standing a long time at a gentle heat or heated for a short time under pressure in a water bath. After evaporation of the spirit the residual oil is taken up with ether and the ethereal solution is shaken with caustic-soda solution to remove small quantities of unaltered benzenesulfoprotocatechuic aldehyde. After distilling off the ether para-benzenesulfoprotocatechuic aldehyde-meta-ethyl ether remains behind as a thick oil, which, after standing, solidifies into a crystalline mass. It crystallizes out of spiri in small crystals (melting-point, 72° centigrade). In a similar way para-benzenesulfoprotocatechuic aldehyde-meta-propyl, meta-isopropyl, meta-isobutyl ether are obtained. The analogous derivatives of para, ortho, and meta toluenesulfonic acids, as well as of alpha and beta naphthalenesulfonic acids, may also be obtained in the same manner. All these compounds of the type of para-benzenesulfoprotocatechuic aldehyde-meta-alkyl ether represent new products.

III. *Production of the Protocatechuic Aldehyde-meta-alkyl Ethers.*

The decomposition of the aromatic sulfo compounds is best obtained by boiling with caustic-soda solution until completely dissolved, air being excluded. The solution is then acidified, and the meta-alkyl ether formed is shaken up with ether and purified by crystallizing out from water.

Protocatechuic aldehyde-meta-ethyl ether crystallizes from water into small glittering scales (melting-point, 77.5° centigrade).

Protocatechuic aldehyde-meta-propyl ether crystallizes from water into fine needles (melting-point, 82° centigrade).

Protocatechuic aldehyde-meta-isopropyl ether represents a thick oil.

Protocatechuic aldehyde-meta-isobutyl ether crystallizes from watery spirit into long needles (melting-point, 94° centigrade).

Having thus described my invention and in what manner it is to be carried out, what I claim as new therein, and desire to secure by Letters Patent, is—

1. The process of obtaining protocatechuic aldehyde-meta-alkyl ether, which consists in causing a suitable compound of the type of benzenesulfo chlorid to act upon a mono-metallic salt of protocatechuic aldehyde, alkylating a salt of the so formed compounds of the type of para-benzenesulfoprotocatechuic aldehyde and splitting off from the compounds of the type of para-benzenesulfoprotocatechuic aldehyde-meta-alkyl ether obtained in that way by means of known saponification agents such as potassium or soda lye, the protocatechuic aldehyde-meta-alkyl ethers, substantially as set forth.

2. As a new product, protocatechuic aldehyde-meta-ethyl-ether having the formula:

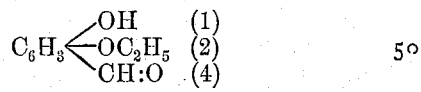

which crystallizes out of water in small glittering scales and melts at about 77.5° centigrade, as specified.

In testimony whereof I have hereunto set my hand this 30th day of June, 1894.

ALBRECHT SCHMIDT.

Witnesses:
W. HAUPT,
E. GRUNWALD.